Oct. 5, 1948.   F. WRIGHT   2,450,622
CENTRIFUGAL SPINNING, TWISTING, AND ANALOGOUS MACHINE
Filed Dec. 13, 1946   11 Sheets-Sheet 1
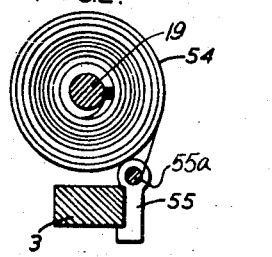
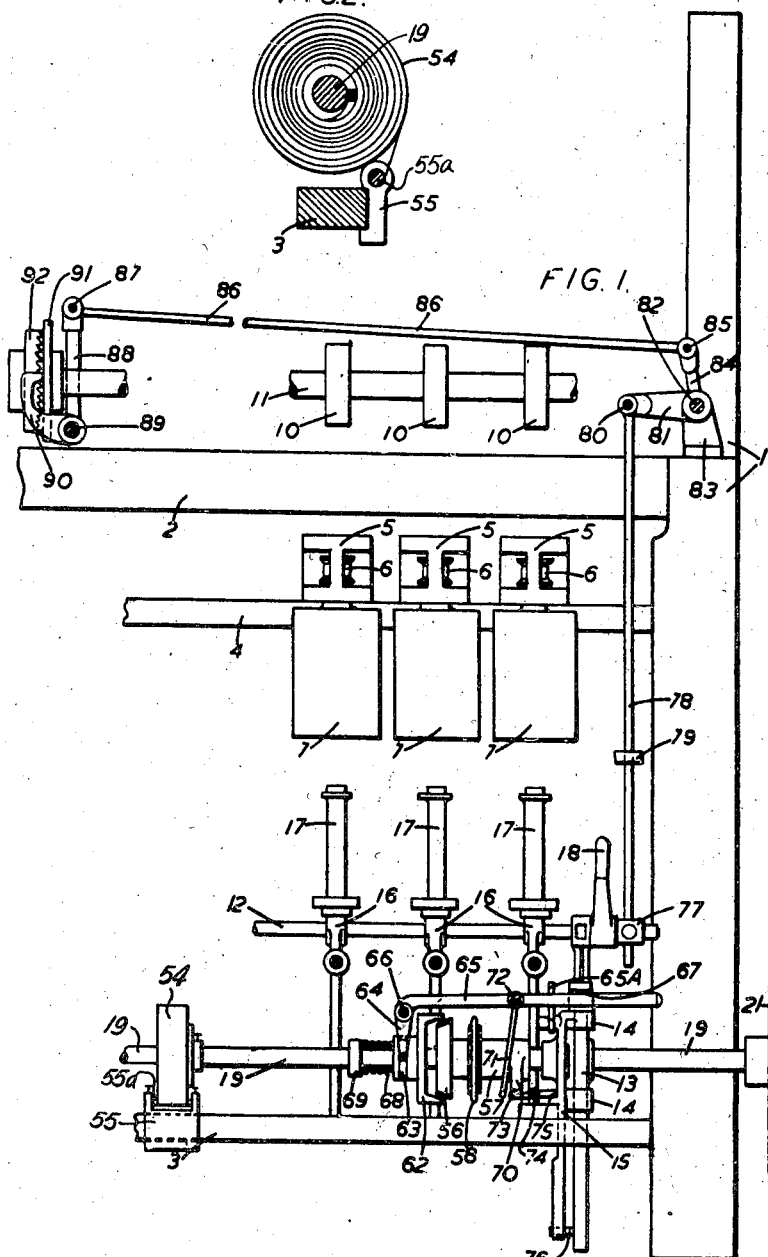
Inventor
FRANK WRIGHT,
By William E. Linton
Attorney

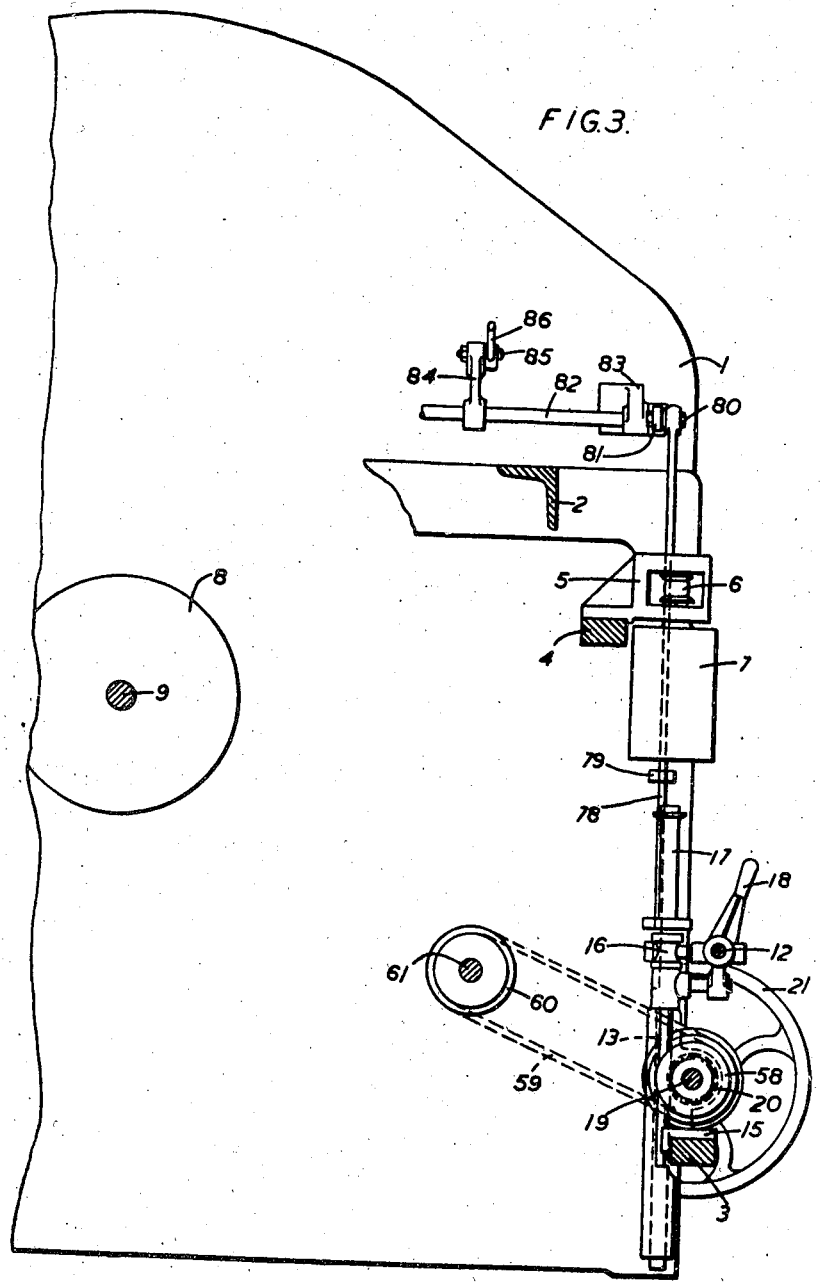

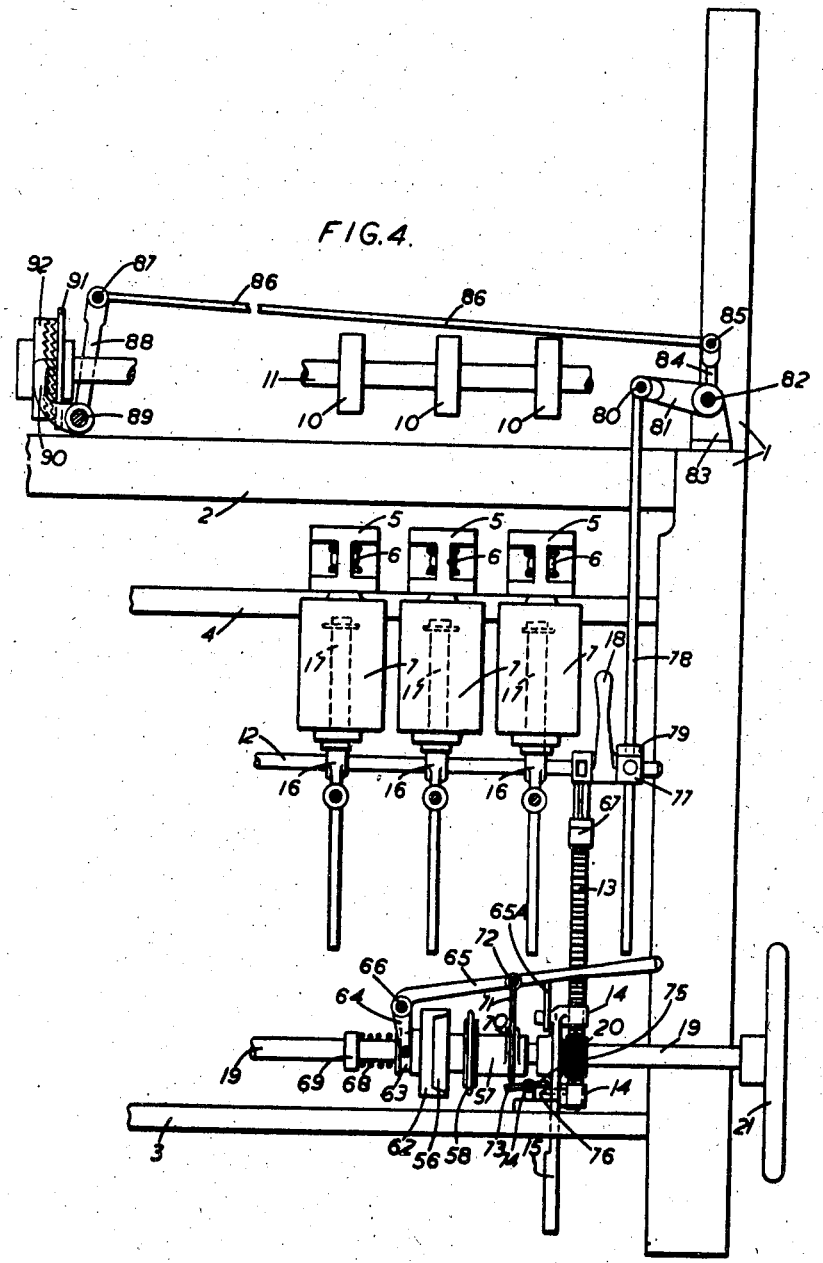

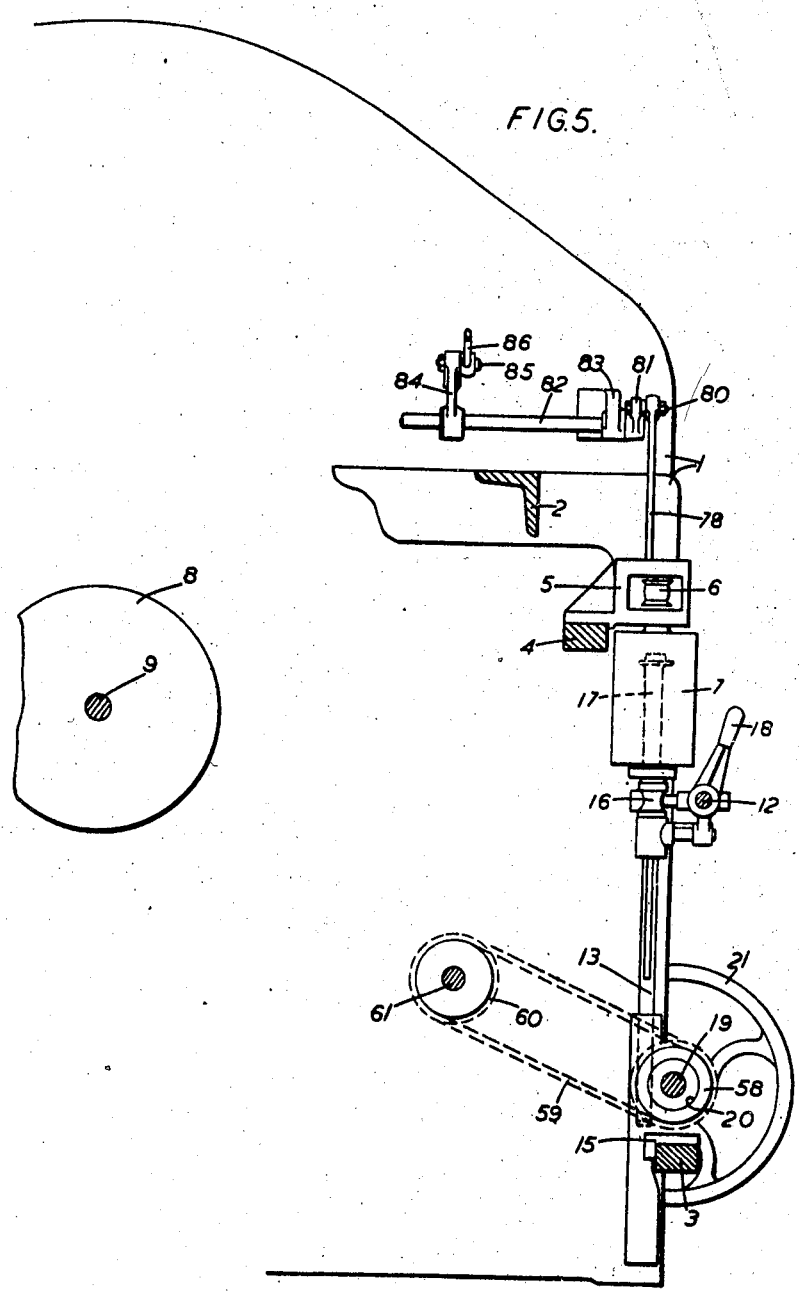

Oct. 5, 1948.  F. WRIGHT  2,450,622
CENTRIFUGAL SPINNING, TWISTING, AND ANALOGOUS MACHINE
Filed Dec. 13, 1946  11 Sheets-Sheet 5
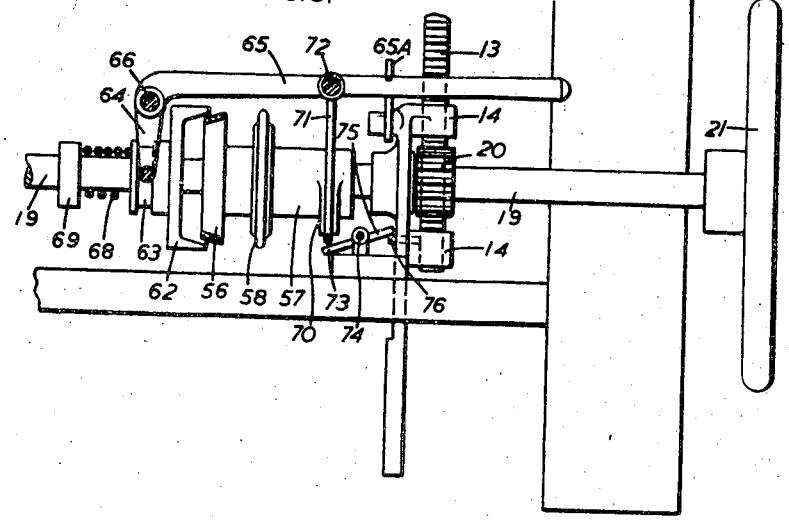
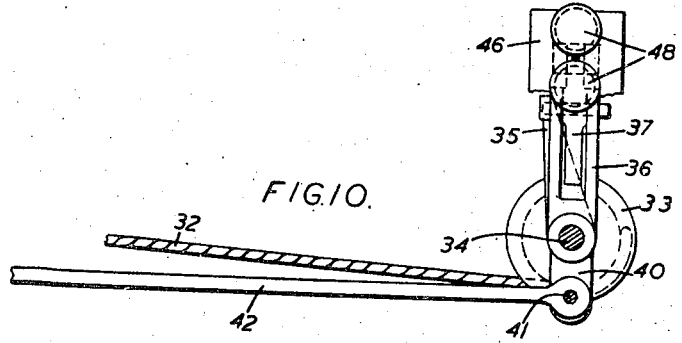
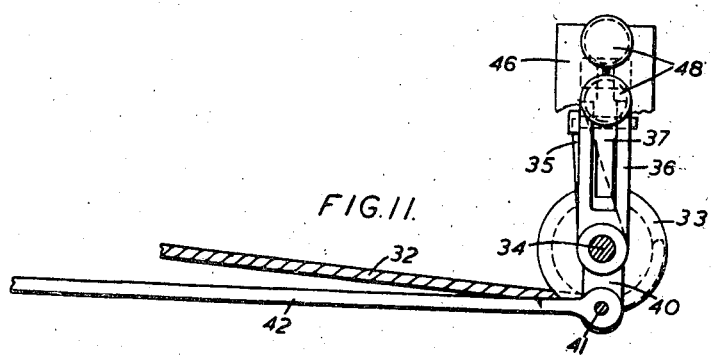
Inventor
FRANK WRIGHT,
By
William C. Linton
Attorney Oct. 5, 1948.　　　　　F. WRIGHT　　　　　2,450,622
CENTRIFUGAL SPINNING, TWISTING, AND ANALOGOUS MACHINE
Filed Dec. 13, 1946　　　　　　　　　　　　11 Sheets-Sheet 6

Inventor
FRANK WRIGHT,
By
William C. Luton
Attorney

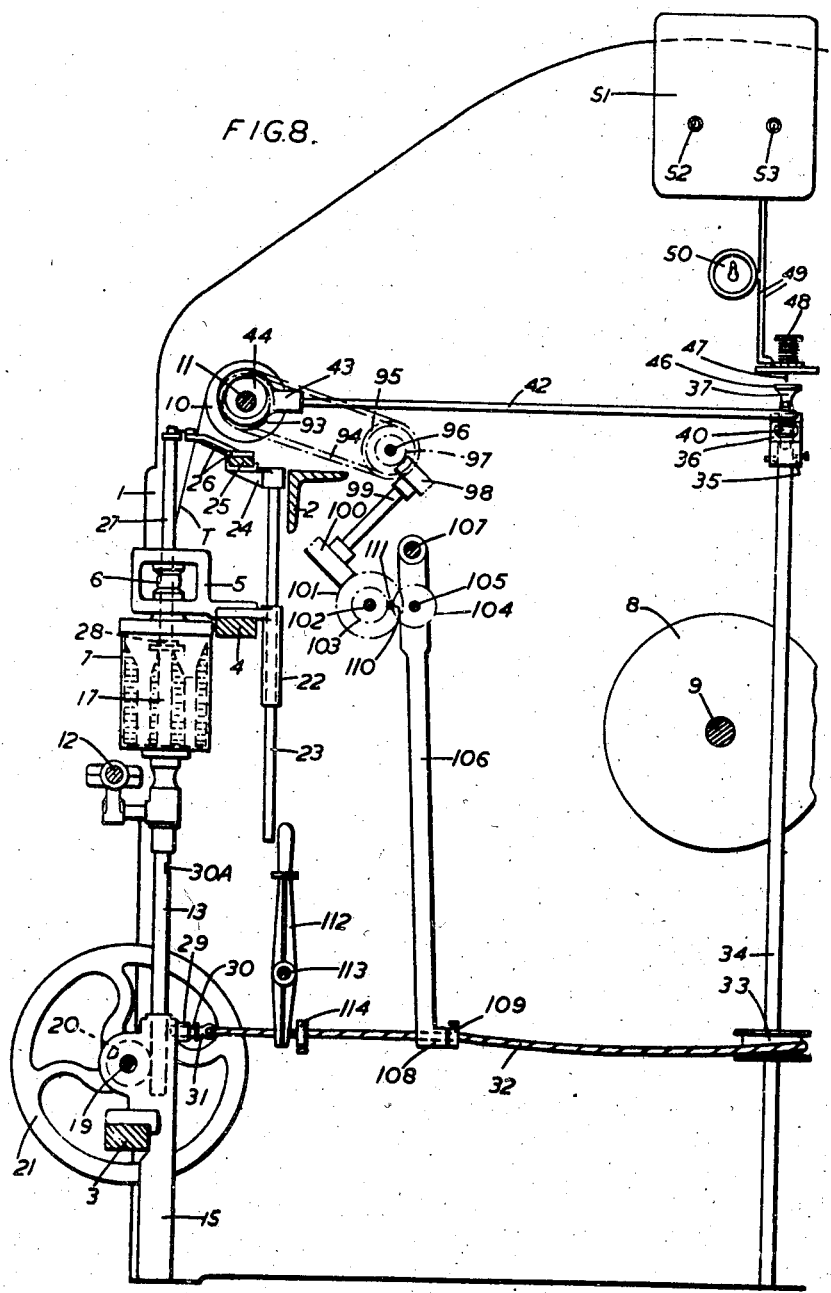

Oct. 5, 1948.                F. WRIGHT                 2,450,622
       CENTRIFUGAL SPINNING, TWISTING, AND ANALOGOUS MACHINE
Filed Dec. 13, 1946                              11 Sheets-Sheet 8
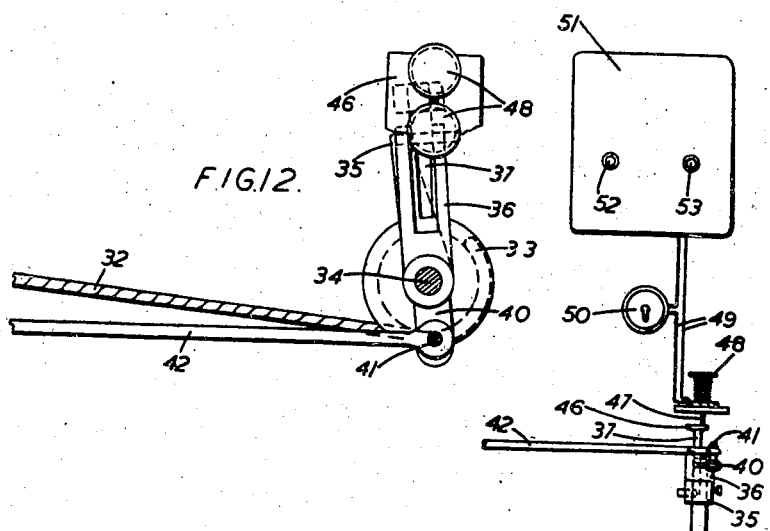
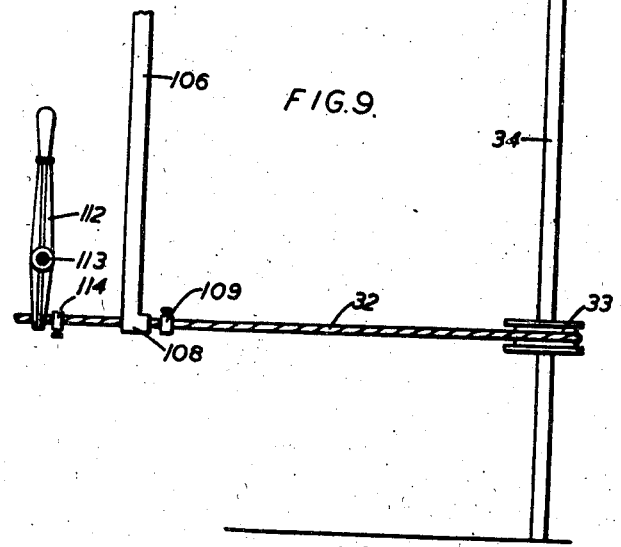
FRANK WRIGHT, Inventor
By William C. Linton.
Attorney Oct. 5, 1948.  F. WRIGHT  2,450,622
CENTRIFUGAL SPINNING, TWISTING, AND ANALOGOUS MACHINE
Filed Dec. 13, 1946  11 Sheets-Sheet 9
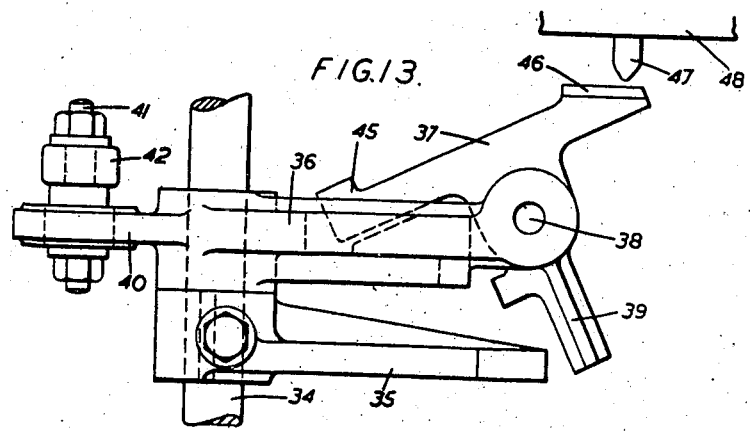
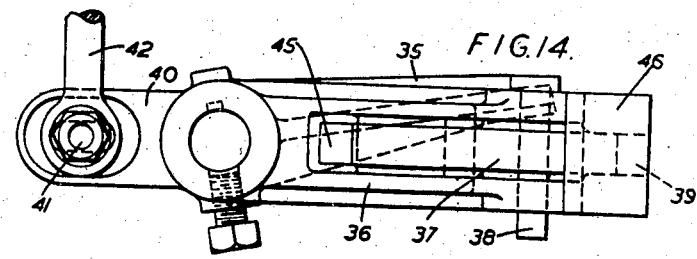
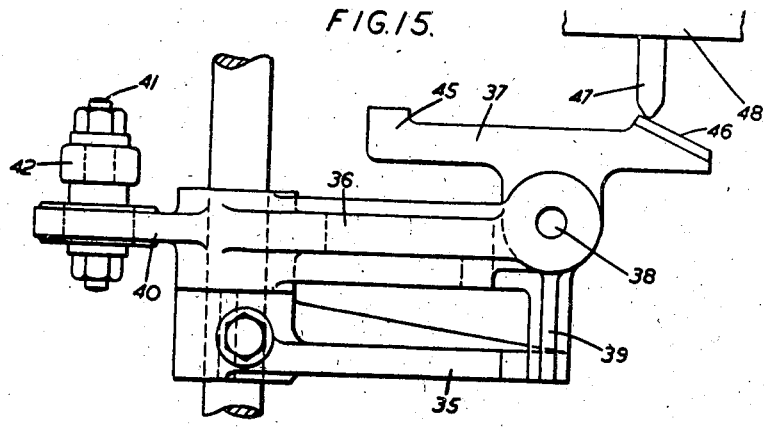
Inventor
FRANK WRIGHT,
By
William C. Linton
Attorney

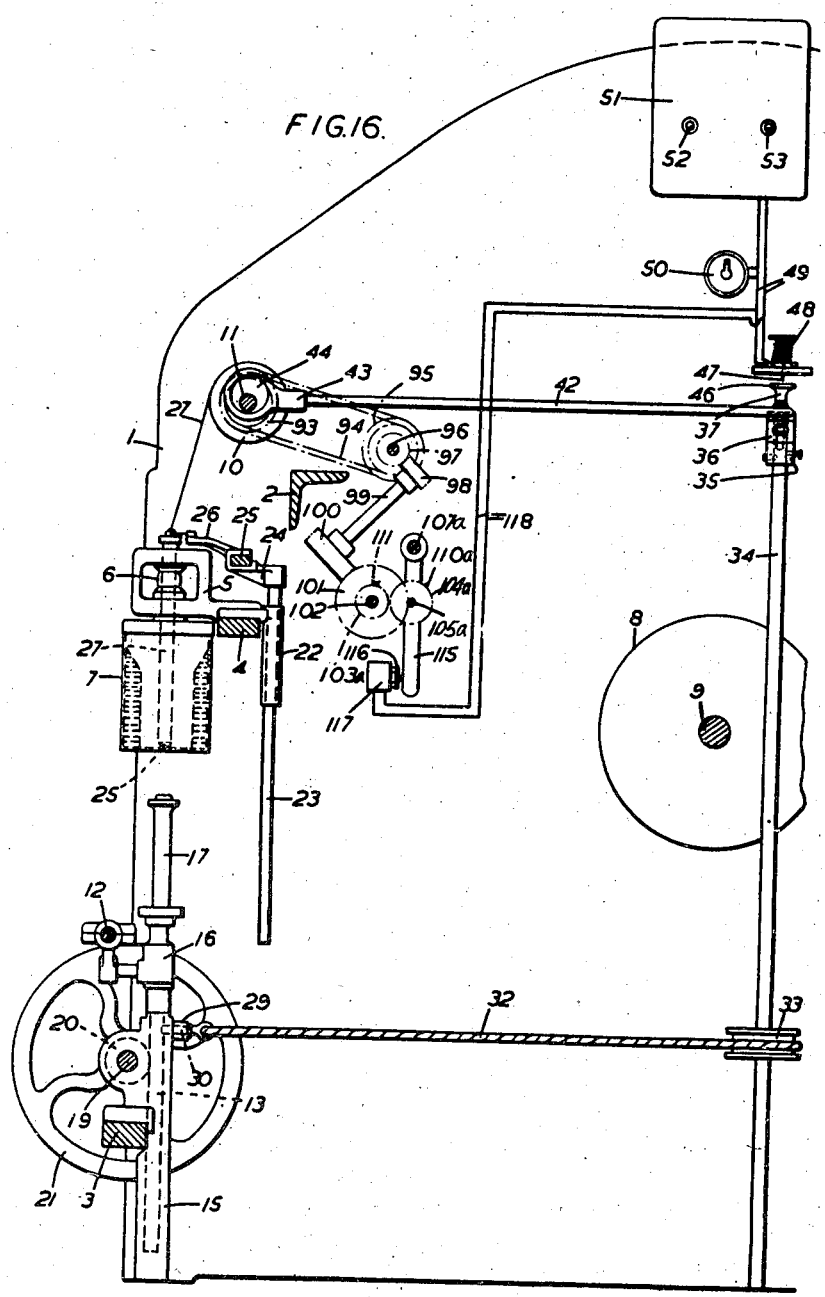

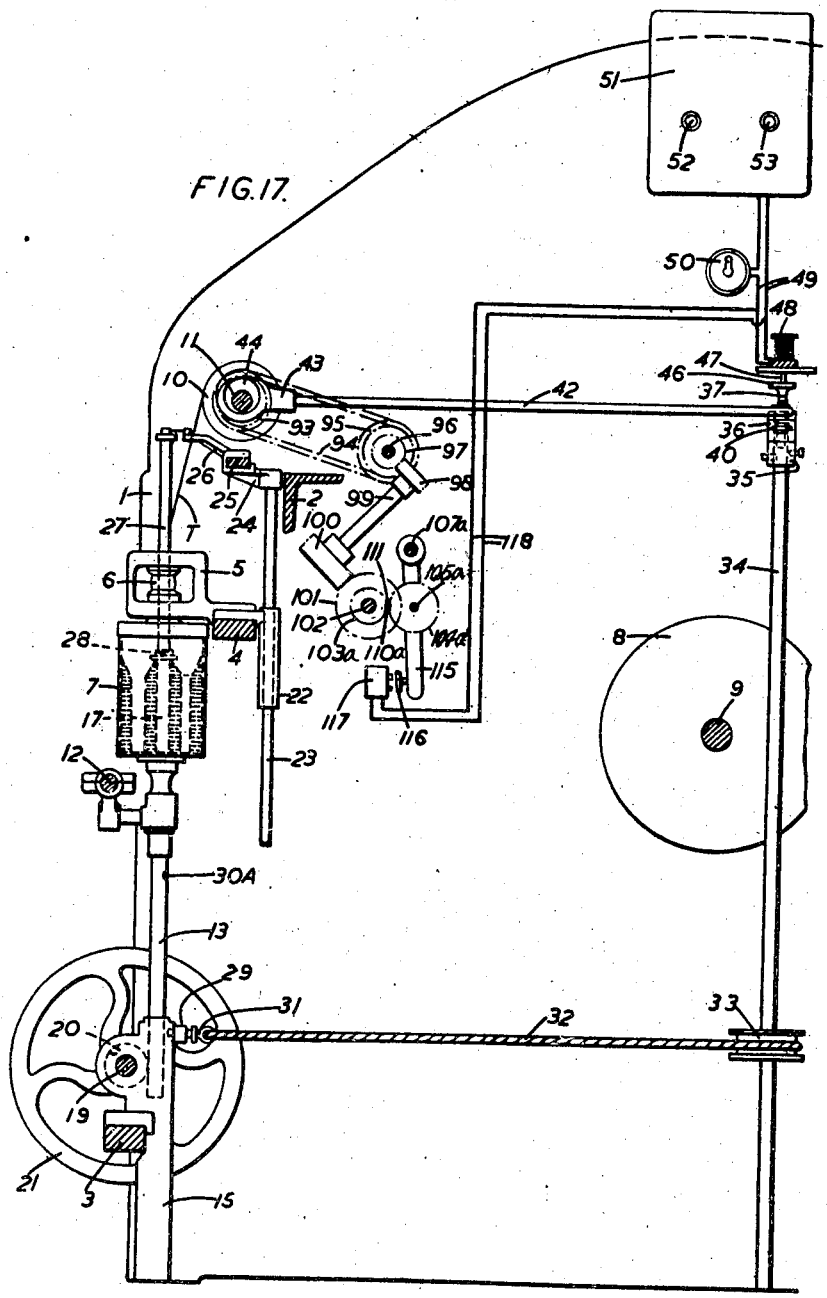

Patented Oct. 5, 1948

2,450,622

UNITED STATES PATENT OFFICE 2,450,622

CENTRIFUGAL SPINNING, TWISTING, AND ANALOGOUS MACHINE

Frank Wright, Haworth, England, assignor to Prince-Smith & Stells Limited, Keighley, England, a British company Application December 13, 1946, Serial No. 716,118
In Great Britain December 17, 1945

8 Claims. (Cl. 57—34)

This invention relates to spinning, twisting, and analogous machines for the centrifugal spinning, twisting or the like, of yarns, threads, and similar filaments, wherein each yarn or other filament is traversed by a vertically reciprocating guide within a revolving holder upon the inner surface of which the yarn or other filament is laid centrifugally and from which holder it is subsequently caused automatically to be wrapped on to a bobbin or other externally wound package inserted into the holder from below, and provided with means to engage the yarn or other filament in order to initiate its transfer to the bobbin; the delivery means being automatically stopped for that purpose while the holder continues to revolve; provision also being made for a sufficient length of yarn or other filament to extend above the bobbin to enable a bobbin when filled to be doffed without the yarn or other filament being subjected to strain.

The invention also has reference to a machine wherein above the normal yarn or other filament mass in each holder there is provided a supplementary length of yarn or other filament destined to be taken up by the bobbin when rewinding and to be paid out thereby during doffing, without imposing tension on the yarn or other filament.

When the source of power supplied to the machine is electric there is a risk that upon a failure of the power supply the yarn or other filament mass within the holders will collapse, owing to the reduction in the speed of rotation of the holders, and cannot be re-wound by the intended method, with the result that wastage occurs; and the primary object of the invention is to obviate such collapse and the consequential disadvantages accruing therefrom; another object being to enable the arrest of the delivery and the initiation of the unwinding of the yarn or other filament to be effected automatically, and a further object being to enable a machine to operate without attention from an operator except for the normal doffing of the bobbins.

According to the invention the delivery means to the yarn holders and the front carriage supporting the bobbins are controlled electro-mechanically in such manner that, in the event of a breakage of the electric power circuit, the front carriage is caused instantly to rise and insert the bobbins into the yarn holders from which the unwinding of the yarn or other filament spun therein is automatically initiated and is completed before the momentum of the holders becomes sufficiently reduced to caues the collapse of the contents of the holders, the delivery to the yarn holders being arrested after the carriage has attained its top position.

Also, according to the invention, means are provided for regulating the speed at which the front carriage is elevated, also for returning the carriage manually to the lowermost position after the completion of an unwinding operation and to re-load the elevating means.

Further, according to the invention, the machine is fitted with one or more manually-operated switch in order that unwinding may be initiated at any desired moment, and means are provided whereby the power circuit is automatically opened and closed in correspondence with, either, the expiration of a predetermined period of time, or on the completion of spinning a predetermined length of yarn or other filament.

Normally, the front carriage is retained releasably in the lowermost position, against the action of a spring motor, and magnetically-operable trip mechanism in circuit with the power supply is adapted, on the failure of the current, to effect the release of the front carriage, the rate of ascent of the carriage when released being regulated by friction clutch mechanism associated with the front cariage pinion shaft.

The front carriage may be maintained in the lowermost position by means of one or more spring-urged latch members connected, either individually or collectively, to an angularly movable vertical rod mounted in bearings on the machine frame and at the head of which is arranged a trip mechanism including a continuously oscillating wiper arm free on the rod and engageable by a biased lever located below a solenoid or equivalent actuator whereof the core is normally maintained by the power circuit above said biased lever and is adapted, on the opening of the circuit, to fall into engagement with said biased lever and to operate the trip mechanism.

In order to cause an emergency ascent of the front carriage, the carriage pinion shaft may be fitted with a strong spring adapted to rotate the shaft immediately the latch constraint on the carriage is released, and to control the rate of ascent of the carriage the pinion shatf may carry a friction clutch whereof one member is fast on and the other is free on the shaft, the latter member being driven at a low speed by chain gearing from a suitable part of the machine motion. Normally, during spinning, these two members of the clutch may be held apart by a toggle lever the free end of which engages a stop on the front carriage which stop, as the carriage ascends, disengages from the clutch lever thus permitting the clutch members to contact at a pressure which is regulated by means of a coil spring, the clutch operating first to retard the ascent of the carriage and subsequently to assist the ascent thereof as the torque exerted by the pinion shaft actuating spring diminishes.

Means are provided for automaticaly declutching when the front carriage reaches its highest position.

One constructional embodiment of the invention is illustrated, by way of example, in the accompanying drawings, which show, semi-diagrammatically, a portion of a known type of electrically-driven centrifugal spinning machine embodying inverted cup-shaped yarn holders; only so much of the machine per se as is necessary to the understanding of the present invention being included in the drawings.

Figure 1 is a front view of the control end of a machine, showing three spindle units and their associated parts in the positions occupied during the spinning operation.

Figure 2 is a detail view, in sectional elevation, of a spring motor employed in the machine, and Figure 3 is a vertical section of Figure 1 looking towards the end of the machine.

Figures 4 and 5 are views similar to Figures 1 and 3, respectively, showing the parts in the unwinding position, and Figure 6 is a detail front view showing the clutch mechanism of Figure 4 in the de-clutched position.

Figures 7 and 8 are end views illustrating the position of certain mechanism, respectively, in the spinning position, and in the unwinding position after having been actuated by the knock-off motion, and Figure 9 is a diagrammatic end view showing the same parts in the unwinding position after operation of the manual control switch.

Figures 10, 11 and 12 are detail plan views of part of the mechanism shown in Figures 7, 8 and 9.

Figure 7:
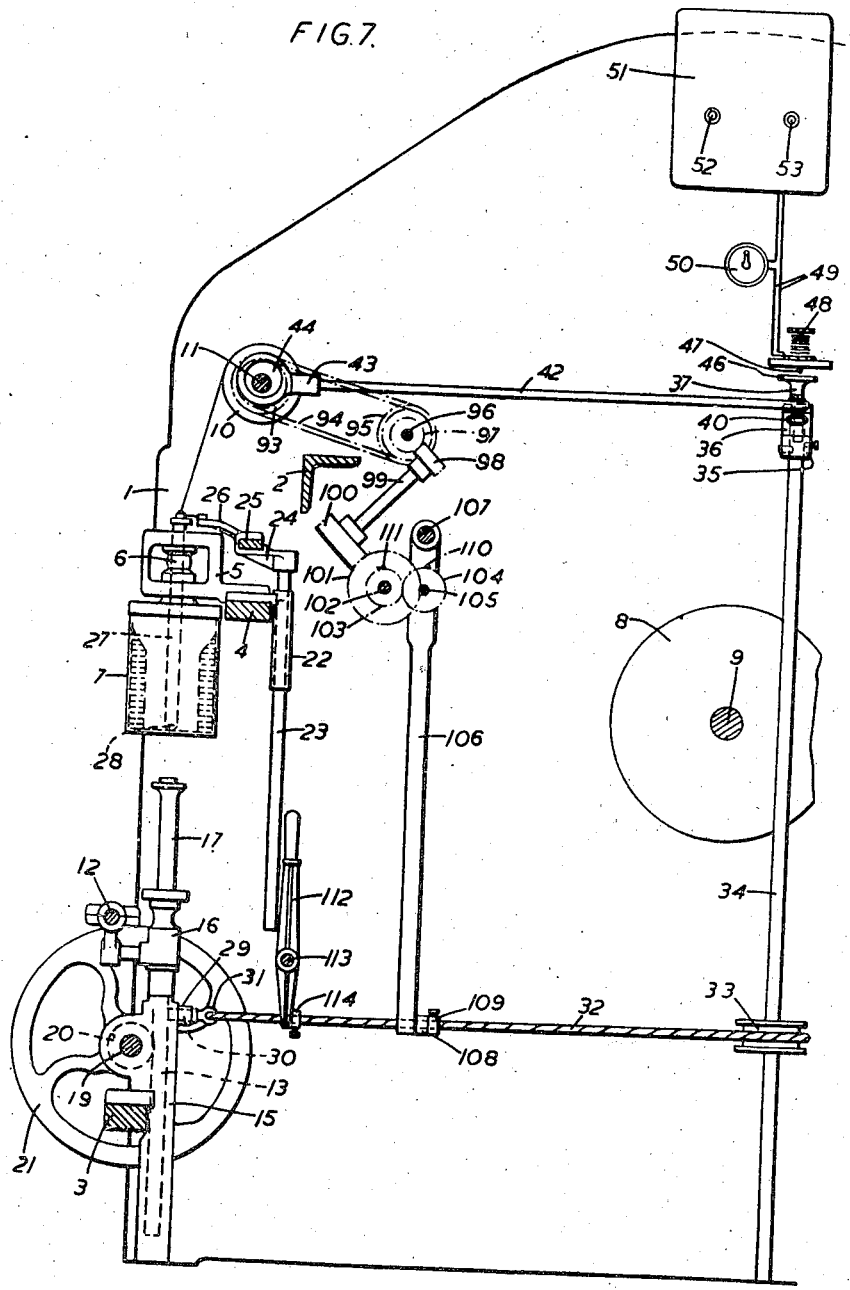

Figures 13, 14 and 15, which are drawn to a larger scale, are detail views, respectively, in side elevation, plan view, and side elevation, of the trip mechanism which controls the movement of the front carriage of the machine, the parts in Figures 13 and 14 being in the position occupied by them when the machine is spinning, and in Figure 15 being in the position occupied when the unwinding operation is occurring either after a failure of the power supply or after the power has been intentionally switched off.

Figures 16 and 17 are views, similar to Figures 7 and 8, illustrating the release of the front carriage by an alternate form of knock-off motion.

The machine illustrated in the drawings is of the double-sided type, that is to say, having a bank of spindles at each side; but the invention is equally applicable to a single sided machine, and for simplification of description, those parts which are normally duplicated in a double-sided machine will be referred to hereafter in the singular.

As has been stated above, the general construction of the machine is known and it includes a main frame having end-stands such as 1, a fixed top rail 2, a fixed bottom rail 3, and a fixed intermediate rail 4 located a short distance below the top rail 2.

Bolted at intervals to the intermediate rail 4 is a plurality of bearing brackets or cages 5 in each of which a whorl 6 is mounted in ball bearings and rotatably connected to each whorl 6 is an inverted cylindrical or cup-shaped yarn holder 7 in which the filaments are spun centrifugally in known manner, each whorl 6 being driven as usual by a tape (not shown) encircling it, and a series of statically balanced pulleys such as 8 carried on a spindle 9 extending the whole length of the machine frame and driven in the normal manner.

Above the top rail 2 are located the usual front rollers 10 carried by a shaft 11 supported in appropriate bearings (not shown).

The front carriage of the machine comprises the usual vertically reciprocable frame having at the top an angularly movable rockshaft 12 extending the length of the machine and supported at intervals by guide posts (not shown) and by vertical rack pillars such as 13 each slidable vertically in guide brackets 14 integral with a casting 15 having a flanged base resting on the bottom rail 3.

To the rockshaft 12 there are secured a series of spindle or bobbin-peg brackets 16 each supporting a bobbin 17 in axial alignment with each of the aforesaid yarn holders 7, and a handle 18 is pivoted adjacent to the head of the rack pillar 13 for actuating the rail or rockshaft 12 during doffing.

Parallel with and below the rockshaft 12, a pinion shaft 19 is supported in bearings on the main frame and has keyed to it pinions, such as 20, corresponding in number to and meshing with rack pillars 13, and an operating handwheel 21 is keyed to the end of the pinion shaft 19.

Secured to the rail 4, adjacent in rear of each of the brackets 5 is a tubular guide bracket 22, see Figures 7 and 8, in which, slidable vertically, is a poker 23 operated by the usual traversing mechanism (not shown) and having fitted at its head a forwardly extending bracket 24 upon which rests a traverse rail 25 to which is fixed in rear of each spindle unit a forwardly extending bracket 26 carrying a tube 27 concentric with and slidable externally of a stationary guide tube (not shown) located within the whorl 6, the tube 27 being slotted rearwardly and fitted at its lower extremity with a traversing thread guide 28 (in a manner already known) for the yarn or other filament T which, after passing over the front roller 10, extends downwardly of the tube 27 through the guide 28 into the yarn holder 7.

The elements described thus far do not, per se, form part of the present invention.

Referring now to Figures 7, 8, 13, 14 and 15.

The rack pillar guide casting 15 is formed integrally at its upper end with a rearwardly projecting tubular boss 29 in which is slidably mounted a spring-urged plunger-latch 30 whereof the forward end normally enters a recess 30A (see Figures 8 and 17) in the back of the rack pillar 13, and the rearward end of the latch 30 is formed with an eye 31 to which is connected one end of a cord 32 the other end of which is made fast to a pulley 33 keyed on a vertical rod 34 mounted, within the machine frame, in bearings (not shown) so as to be movable angularly.

Near the head of the rod 34 is fixed a radial arm 35 above and parallel with which a bracket 36 is mounted freely on the rod 34 and carries pivotally in its forked free end a trip arm 37 articulated at 38 and formed with an integral depending finger 39.

At its end remote from the pivoted trip arm 37 the bracket 36 is formed integrally with a slotted link 40 to which is articulated at 41 one end of a connecting rod 42 whereof the forward end has secured to it an eccentric strap 43 encircling an eccentric sheave 44 carried by the front roller shaft 11, by which means oscillatory or wiping motion is imparted to the bracket 36 and the trip arm 37 carried by it.

The trip arm 37 is biased by means of a weighted extension 45 so as normally to maintain the depending finger 39 above the plane of the fixed radial arm 35, and remotely from the weighted end 45 the trip arm 37 is formed with a flat-surfaced toe 46 normally presented (see Figure 13) in proximity to and below the lower end of a plunger 47 held out of contact with the surface 46 by an electro-magnet 48 in circuit through wiring 49 and switch 50 with the electric control panel 51 of the driving motor (not shown) of the machine; the panel 51 being provided with a starting push-button 52 and a stopping push-button 53.

The control of the rate of ascent of the front carriage is effected by the following mechanism which is shown in Figures 1 to 6 inclusive.

The front carriage pinion shaft 19 is encircled at a convenient point in its length by a powerful spring 54, of the clock-spring type, the inner end of which spring is made fast to the shaft 19 and its outer end is connected to an anchorage 55 fixed to the bottom rail 3 (see Figure 2), and on the pinion shaft 19 there is mounted a friction cone-clutch whereof the male member 56 is borne by a boss or sleeve 57 freely rotatable on the shaft 19 and driven at a constant predetermined speed by means of a sprocket wheel 58 fast on the sleeve 57 and encircled by a chain 59 passing over a second sprocket wheel 60 (Figures 3 and 5) carried by a motion shaft 61 actuated from the normal driving mechanism of the machine. The female clutch member 62 of the cone-clutch is splined on the pinion shaft 19 and is provided with an integral groove thrust collar 63 engaged by the depending forked end 64 of a cranked clutch-withdrawal lever 65 pivoted at 66 to a bracket (not shown) and extending towards the end-stand 1, the free end of this lever 65 being retained, when the front carriage is in the lowermost or spinning position indicated in Figure 1, by a lug 67 formed at the upper end of the adjacent rack pillar 13, in which position the clutch-withdrawal lever 64, 65, holds the splined female clutch member 62 out of engagement with the clutch member 56 and against a compression spring 68 confined between the thrust collar 63 and an annular abutment 69 fixed on the shaft 19.

At its end remote from the clutch member 56 the boss or sleeve 57 is formed integrally with a cam 70 and encircling the sleeve 57 there is a hoop 71 suspended pivotally at 72 from the clutch-withdrawal lever 65 and, during the spinning operation, held out of the plane of rotation of the cam 70 by the nose 73 of a trip lever pivoted at 74 on the casting 15 and having a tail 75 adapted to be contacted by a lug 76 carried near the foot of the rack pillar 13.

The bobbin rockshaft 12 carries an apertured boss 77 fitting slidably over a vertical push-rod 78 slidable in bearing brackets (not shown) and having a collar 79 fixed to it at a determined height, the upper extremity of the push-rod 78 being articulated at 80 to a lever 81 carried by an arbor 82 mounted in a bearing bracket 83 secured on the end-stand 1, and on the arbor 82 a second lever 84 is keyed and has articulated to it at 85 one end of a connecting rod 86 whereof the opposite end is articulated at 87 to an arm 88 fast on a rockshaft 89 carrying a curved clutch-operating lever 90 which controls a serrated clutch mechanism 91, 92, on the front roller shaft 11 which can thereby be disconnected from its normal driving mechanism.

In order to enable the unwinding of the yarn masses from the yarn holders 7 to be initiated upon a predetermined length of yarn having been spun thereinto, a knock-off motion of a well-known type is driven through the medium of a sprocket wheel 93 keyed to the front roller shaft 11 (Figures 7 and 8) and coupled by a chain 94 to a sprocket wheel 95 keyed on a countershaft 96 which also has keyed to it a gear wheel 97 meshing with a gear wheel 98 on the upper end of an obliquely disposed spindle 99 on the lower end of which is a second gear wheel 100 in mesh with a change wheel 101 keyed on an arbor 102 and driving the knock-off motion proper. This motion consists of a wheel 103 keyed on the arbor 102 and a wheel 104 journalled on a pintle 105 carried by a lever 106 which is pivoted at 107 at its upper end and is provided at its lower end with a thimble or fair-lead 108 embracing the cord 32 on which cord an abutment stop 109 is fixed in proximity to the fair-lead 108.

The two members 103 and 104 of the knock-off motion are constituted by the known male and female hunting teeth 110, 111, which mesh to force the wheels apart at a predetermined time as regulated by the selective change wheel 101.

In addition to the knock-off motion to control the cord 32 a manual control is also provided with one at each side of the machine, if double-sided, for a purpose mentioned hereafter, consisting of a handlever 112 pivoted at 113 and apertured or forked at its lower end for the passage therethrough of the cord 32 on which a second abutment stop 114 is fixed adjacent the lower end of the lever 112.

The primary function of the invention is automatically to control the front carriage in the following manner:

During the centrifugal spinning of the yarn or other filament in the yarn holders 7, the front carriage assembly is in the position shown in Figures 1 and 7, the radial arm 36 is receiving continuous oscillatory movement of small amplitude from the eccentric 44 on the front roller shaft 11, and the plunger 47 is being maintained in an elevated position clear of the trip arm 37 by the electromagnet 48 which is energised while the power current is flowing normally.

In the event of a failure of the power supply the electromagnet 48 is immediately de-energised, releasing the plunger 47 which drops on the flat surface 46 of the trip arm 37 and overbalances the arm from the position shown in Figure 13 to that shown in Figure 15, thus causing the depending finger 39 to be presented into the plane of the radial arm 35 and to impart to it the oscillatory movement of the bracket 36, the effect of which is to transmit angular movement to the vertical rod 34 and the pulley 33 keyed on it, in a direction to exert a pull on the cord 32, whereby the plunger-latch 30 is withdrawn from the recess in the rack pillar 13.

When this withdrawal of the plunger-latch 30 occurs, the clock spring 54 immediately rotates the pinion shaft 19 and the front carriage is elevated by the normal mechanism, raising the bobbins 17 into the yarn holders 7 to initiate the unwinding on to the bobbins of the yarn in the holders.

Simultaneously with the disengagement of the lug 67 from the clutch-withdrawal lever 65, due to the rising of the front carriage, the clutch thrust-spring 68 causes the forked end 64 of the lever 65 to force the splined female clutch member 62 into contact with the coned clutch member 56, the engagement of the clutch members 56 and 62 serving in the first instance to retard the initial rate of ascent of the front carriage and subsequently supplementing the diminishing torque exerted by the spring 54.

Towards the end of the upward movement of the front carriage the boss 77 contacts with the collar 79 and thereby causes the push-rod 78 to be raised and, through arms 81, 84, and connecting rod 86, arm 88, and clutch-operating lever 90, the clutch members 91 and 92 are declutched and the front roller-shaft 11 and rollers 10 are arrested in readiness for the unwinding operation.

When the front carriage attains its highest position, as in Figure 4, the lug 76 at the foot of the rack pillar 13 contacts the tail 75 of the pivoted trip lever, releasing the nose 73 thereof from contact with the pivoted hoop 71 which thereupon swings into alignment circumferentially of the cam 70 and, by contact with the inner surface of the loop 71, the cam causes the clutch-withdrawal lever 65, 64, to disengage the clutch member 62 from the clutch member 56, the lever being held by an auxiliary catch 65A on the rack pillar guide casting 15 (see Figure 6).

This automatic de-clutching of the pinion shaft 19 immediately the highest point in the ascent of the front carriage is reached, eliminates unnecessary friction which might retard the rotation of the yarn holders 7 and might prevent their rotating for a sufficient length of time to enable the spun material to be unwound before any collapse thereof can occur by reason of the reduction of the speed of the yarn holders 7.

In Figure 7 an annulus of spun yarn is depicted by broken lines within the yarn holder 7, and in Figure 8 the same annulus is depicted partly unwound on to the bobbin 17, and when the unwinding operation has been completed the front carriage is wound back to its lowermost position by means of the handwheel 21, the rotation of the pinion shaft 19 reloading the spring 54, and the lowering of the carriage releasing the auxiliary catch 65A from the clutch-withdrawal lever 65 and re-engaging the lug 67 with the lever 65.

Normal unwinding, as distinct from emergency unwinding due to power failure, can be initiated whenever required by manipulation of the switch 50 to break the circuit to the electromagnet 48.

When it is desired to enable the unwinding from the yarn holders 7 to be initiated upon a predetermined length of yarn having been spun thereinto, the knock-off motion 103, 104, 110, 111, is set or adjusted appropriately, and when the required length of yarn has been spun the plunger 30 is withdrawn from the rack pillar 13 by the thimble 108 on the pivoted lever 106 being caused to strike the stop 109 on the cord 32.

When this arrangement of knock-off motion is employed the electric circuit is not broken and therefore the trip mechanism 35, 36, 37, 47, 48, does not function. The knock-off motion can, however, be so arranged that the electric circuit is broken and the front carriage is released in the same manner as if a power failure had occurred. This alternative is shown in Figures 16 and 17, wherein the arbor 105a of the wheel 104a carrying the male hunting tooth 110a is carried by a depending arm 115 pivoted at 107a and having mounted on it at its lower end the armature 116 of an electromagnetically operated trip switch 117 which is connected by wires 118 to the wires 49 leading into the control panel 51.

By this arrangement, instead of the lever 106 actuating the cord 32, as described with reference to Figures 7 and 8, the wheels 103a and 104 of Figs. 16 and 17 are caused to impart angular movement at the required periods to the pivoted depending arm 115, resulting in the breaking of the circuit through the trip switch 117 and the electromagnet 48, whereupon the plunger 47 falls and actuates the trip mechanism 48, 37, 36, 35, and the vertical spindle 34 in the manner already described and causes the plunger 30 to be withdrawn from the rack pillar 13 and the front carriage to be released.

The invention is not limited to any particular type of knock-off motion nor selective gearing, nor whether mechanically or electrically operated, for the purpose of stopping the machine if and when required, and a timing mechanism (not shown) of any appropriate variety may be incorporated which is put into operation by the elevation of the front carriage into the unwinding position, designed to regulate the time between the initiating of the unwinding and the stopping of the machine, whereby the machine is capable of being left unattended and, at a specified time, automatically to effect the unwinding operation and then to stop the machine. The arrangement is such that the timing mechanism can be disconnected, or the mechanism for stopping the machine after unwinding has been completed thrown out-of-gear, since it is not required between normal doffing operations when operatives are in attendance.

In the case of a double-sided spinning frame, either a single electro-magnet 48 and plunger 47 can be employed to control both sides of the machine, the connections being such that unwinding is initiated on both sides of the machine simultaneously, or, should it be desired to enable unwinding on one side of the machine to take place while the other side is spinning, a separate electro-magnet and plunger and duplicate starting and stopping switches can be fitted thereon. Or to enable unwinding on one side only of the machine to be effected, without using the trip mechanism, a pivoted handlever 112 connected operatively to the plunger-latch cord 32 as shown in Figures 7 and 8 may be employed on both sides of the machine.

This latter arrangement enables different counts to be spun on the two sides of the machine without difficulty and is simpler than duplicating the electro-magnetic mechanism.

It is to be understood that in practice modifications in design and operation may be made, to suit the handling of filaments of a particular nature or possessing special characteristics, without departing from the spirit of the invention.

By means of the above described invention, the collapse of the spun yarn within the yarn holders if a power failure occurs, is prevented, the initiation of the unwinding operation is effected automatically, and the machine is enabled to operate without the attention of an operator save for the normal doffing of the bobbins.

I claim:
1. An electrically driven centrifugal spinning, twisting or analogous machine, including delivery means to deliver yarn to a series of rotary yarn holders, a vertically reciprocable front carriage, an actuating shaft for said front carriage, a series of bobbins supported by said front carriage to receive yarn from said yarn holders, electro-mechanical control mechanism in circuit with an electric power supply, said control mechanism being common to said yarn delivery means and said front carriage and being operable in the event of a breakage of the electric power circuit, retaining means normally holding said front carriage in its lowermost position, said retaining means being releasable by said control mechanism, and a motor connected to said actuating shaft to elevate said front carriage when released from said retaining means to cause the bobbins to be inserted into said yarn holders whereby the unwinding of the filament spun therein is automatically initiated.

2. An electrically-driven centrifugal spinning, twisting or analogous machine, including delivery means to deliver yarn to a series of rotary yarn holders, a vertically reciprocable front carriage, an actuating shaft for said front carriage, a series of bobbins supported by said front carriage to receive yarn from said yarn holders, electro-mechanical control mechanism in circuit with an electric power supply, said control mechanism being common to said yarn delivery means and said front carriage and being operable in the event of a breakage of the electric power circuit, retaining means normally holding said front carriage in its lowermost position, said retaining means being releasable by said control mechanism, a motor connected to said actuating shaft to elevate said front carriage when released from said retaining means to cause the bobbins to be inserted into said yarn holders and the unwinding of the filament spun therein to be automatically initiated, and speed regulating mechanism connected to said actuating shaft to control the rate of ascent of the front carriage.

3. An electrically-driven centrifugal spinning, twisting or analogous machine, including delivery rollers to deliver yarn to a series of rotary yarn holders, a vertically reciprocable front carriage, an actuating shaft for said front carriage, rack and pinion elevating gear associated with said actuating shaft, a series of bobbins supported by said front carriage to receive yarn from said yarn holders, electro-mechanical trip mechanism in circuit with an electric power supply, said trip mechanism being common to said yarn delivery rollers and said front carriage and being operable in the event of a breakage of the electric power circuit, means positively retaining said front carriage in its lowermost position, said retaining means being releasable by said trip mechanism, a spring motor connected to said actuating shaft to actuate said rack and pinion elevating gear when said carriage is released from said retaining means, and speed regulating friction clutch mechanism connected to said actuating shaft to control the rate of ascent of the front carriage.

4. An electrically-driven centrifugal spinning, twisting or analogous machine, including delivery rollers to deliver yarn to a series of rotary yarn holders, a vertically reciprocable front carriage, an actuating shaft for said front carriage, rack and pinion elevating gear associated with said actuating shaft, a series of bobbins supported by said carriage to receive yarn from said yarn holders, electro-mechanical trip mechanism in circuit with an electric power supply, said trip mechanism being common to said yarn delivery rollers and said front carriage and being operable in the event of a breakage of the electric power circuit, means positively retaining said front carriage in its lowermost position, said retaining means being releasable by said trip mechanism, a spring motor connected to said actuating shaft to actuate said rack and pinion elevating gear when said carriage is released from said retaining means, speed regulating friction clutch mechanism connected to said actuating shaft to control the rate of ascent of the front carriage, and abutments on said front carriage automatically effecting the operation of said speed regulating friction clutch mechanism.

5. An electrically-driven centrifugal spinning, twisting or analogous machine, including delivery rollers to deliver yarn to a series of rotary yarn holders, a vertically reciprocable front carriage, an actuating shaft for said front carriage, rack and pinion elevating gear associated with said actuating shaft, a series of bobbins supported by said front carriage to receive yarn from said yarn holders, electro-mechanical trip mechanism in circuit with an electric power supply, said trip mechanism being common to said yarn delivery rollers and said front carriage and being operable in the event of a breakage of the electric power circuit, means positively retaining said front carriage in its lowermost position, said retaining means being releasable by said trip mechanism, a spring motor connected to said actuating shaft to actuate said rack and pinion elevating gear when said carriage is released from said retaining means, speed regulating friction clutch mechanism connected to said actuating shaft to control the rate of ascent of the front carriage, abutments on said front carriage automatically effecting the operation of said speed regulating friction clutch mechanism, and connections actuated by the ascent of the front carriage for the purpose of disconnecting the drive of the yarn delivery means during the ascent of the front carriage.

6. An electrically-driven centrifugal spinning, twisting or analogous machine, including delivery means to deliver yarn to a series of inverted cup-shaped rotary yarn holders, a vertically reciprocable front carriage, an actuating shaft for said front carriage, a series of bobbins supported by said front carriage to receive spun yarn from said yarn holders, electro-mechanical control mechanism in circuit with an electric power supply, said control mechanism being common to said yarn delivery means and said front carriage and being operable in the event of a breakage of the electric power circuit, retaining means normally holding said front carriage in its lowermost position, said retaining means being releasable by said control mechanism, a motor connected to said actuating shaft to elevate said front carriage when released from said retaining means to cause the bobbins to be inserted into said yarn holders and the unwinding of the filament spun therein to be automatically initiated, speed regulating mechanism connected to said actuating shaft to control the rate of ascent of the front carriage, and a knock-off motion connected operatively to said retaining means and serving to cause the release of the front carriage upon the completion of the spinning operation.

7. An electrically-driven centrifugal spinning, twisting or analogous machine, including in combination, a series of yarn delivery rollers mounted on a driving shaft, a series of rotary inverted cup-shaped yarn holders, a vertically reciprocable front carriage supporting a series of empty bobbins, spring-actuated rack and pinion elevating gear for said carriage, a latch member normally engaging and retaining said carriage in its lowermost position, electro-magnetically-operable trip mechanism interposed between the driving shaft of the yarn delivery rollers and the carriage and connected operatively to an electric power circuit and to said latch member, said trip member being carried by an angularly movable vertical support and including a continuously oscillating wiper arm mounted free on said support and engageable by a biased lever located below a solenoid core actuable by the opening of the power circuit, clutch mechanism associated with said rack and pinion gearing to control the rate of ascent of said carriage, the carriage having abutments automatically effecting the operation of said clutch mechanism, connections actuated by the ascent of the front carriage serving to disconnect the drive of the yarn delivery rollers during the ascent of the carriage, and a knock-off motion connected operatively with said latch member to cause the release of the front carriage upon the completion of the spinning of the yarn within the yarn holders; the ascent of the front carriage causing the bobbins to be inserted in the rotating holders from which the unwinding of the yarn spun therein is automatically initiated and is completed before the momentum of the holders becomes sufficiently reduced to cause the collapse of the contents of the yarn holders.

8. An electrically-driven centrifugal spinning, twisting or analogous machine, as claimed in claim 1 and having a row of spindle units on both sides of the machine, provided with a manual lever control of the bobbin carriers in order to enable unwinding to be initiated on one side only of the machine while the spinning or twisting continues at the other side.

FRANK WRIGHT.

REFERENCES CITED

The following references are of record in the file of this patent:

UNITED STATES PATENTS

| Number | Name | Date |
|---|---|---|
| 874,662 | De Vito | Dec. 24, 1907 |
| 1,800,830 | Gordon, Jr. | Apr. 14, 1931 |
| 2,142,760 | Prince-Smith | Jan. 3, 1939 |